United States Patent
Miri Ramsheh et al.

(10) Patent No.: US 12,023,856 B2
(45) Date of Patent: Jul. 2, 2024

(54) MULTI-MATERIAL PRINTER DEVICE FOR MANUFACTURE OF HIGH-THROUGHPUT SCREENING MICROFLUIDIC CHIPS

(71) Applicant: Rowan University, Glassboro, NJ (US)

(72) Inventors: Amir K. Miri Ramsheh, Haddonfield, NJ (US); Anant Bhusal, Glassboro, NJ (US); Hai Anh Nguyen, Glassboro, NJ (US); Daniel Nieto, Glassboro, NJ (US)

(73) Assignee: ROWAN UNIVERSITY, Glassboro, NJ (US)

( * ) Notice: Subject to any disclaimer, the term of this patent is extended or adjusted under 35 U.S.C. 154(b) by 312 days.

(21) Appl. No.: 17/297,305

(22) PCT Filed: Mar. 31, 2021

(86) PCT No.: PCT/US2021/025025
§ 371 (c)(1),
(2) Date: May 26, 2021

(87) PCT Pub. No.: WO2021/216258
PCT Pub. Date: Oct. 28, 2021

(65) Prior Publication Data
US 2023/0347579 A1 Nov. 2, 2023

Related U.S. Application Data

(60) Provisional application No. 63/136,387, filed on Jan. 12, 2021, provisional application No. 63/013,871, filed on Apr. 22, 2020.

(51) Int. Cl.
*B29C 64/124* (2017.01)
*B29C 64/241* (2017.01)
(Continued)

(52) U.S. Cl.
CPC .......... *B29C 64/124* (2017.08); *B29C 64/241* (2017.08); *B29C 64/393* (2017.08);
(Continued)

(58) Field of Classification Search
CPC ... B29C 64/124; B29C 64/393; B29C 64/241; B33Y 10/00; B33Y 30/00; B33Y 50/02
(Continued)

(56) References Cited

U.S. PATENT DOCUMENTS 5,942,443 A   8/1999   Parce
6,150,180 A   11/2000  Parce
(Continued)

OTHER PUBLICATIONS

International Search Report and Written Opinion mailed Jun. 30, 2021, in International Application No. PCT/US21/25025.
(Continued)

*Primary Examiner* — Jeffrey M Wollschlager
*Assistant Examiner* — Xue H Liu
(74) *Attorney, Agent, or Firm* — FisherBroyles LLP

(57) ABSTRACT

A multi-material printer for using multiple materials, e.g., bioinks, to quickly fabricate structures, such as high-throughput screening microfluidic chips. The printer's light projector for emits light in an exposure sequence to cure material in an additive manufacturing process. The printer further includes a motion stage operable to move a build platform into and out of the reservoir in coordination with the exposure sequence. The printer further includes an indexing stage having a work table for supporting the reservoir. The indexing stage is operable to selectively align the build platform with multiple different materials of the reservoir. The multiple materials may be arranged at distinct angular positions within a single reservoir, and the indexing stage may be operable to rotate the work table to align the build platform with different materials during the exposure
(Continued)

sequence for a quick transition among different materials without refilling of materials, exchange of reservoirs, etc.

21 Claims, 14 Drawing Sheets

(51) Int. Cl.
 *B29C 64/393* (2017.01)
 *B33Y 10/00* (2015.01)
 *B33Y 30/00* (2015.01)
 *B33Y 50/02* (2015.01)
(52) U.S. Cl.
 CPC ............... *B33Y 10/00* (2014.12); *B33Y 30/00* (2014.12); *B33Y 50/02* (2014.12)
(58) Field of Classification Search
 USPC ........................................................ 264/401
 See application file for complete search history.

(56) References Cited

U.S. PATENT DOCUMENTS

| | | |
|---|---|---|
| 9,068,281 B2 | 6/2015 | Wu |
| 2012/0195994 A1 | 8/2012 | El-Siblani |
| 2015/0165678 A1 | 6/2015 | Ding |
| 2015/0190963 A1 | 7/2015 | Lee |
| 2016/0144535 A1 | 5/2016 | Touma |
| 2016/0368210 A1 | 12/2016 | Chen |
| 2017/0348902 A1 | 12/2017 | Ohara |
| 2019/0291342 A1 | 9/2019 | Chen |
| 2020/0147873 A1 | 5/2020 | Lewis |
| 2020/0164109 A1 | 5/2020 | Kroll |
| 2020/0324469 A1 | 10/2020 | Zhang |

OTHER PUBLICATIONS

Miri, et al. "Microfluidics-Enabled Multimaterial Maskless Stereolithographic Bioprinting," Adv Mater. 2018;30(27):e1800242. doi:10.1002/adma.201800242.

MULTI-MATERIAL PRINTER DEVICE FOR MANUFACTURE OF HIGH-THROUGHPUT SCREENING MICROFLUIDIC CHIPS

CROSS-REFERENCE TO RELATED APPLICATION

This application is a national stage application of International Application No. PCT/US21/25025, filed Mar. 31, 2021, which claims the benefit of priority, under 35 U.S.C. § 119(e), of U.S. provisional patent application No. 63,013,871, filed Apr. 22, 2020, and U.S. provisional patent application No. 63,136,387, filed Jan. 12, 2021, the entire disclosures of both of which are hereby incorporated herein by reference.

FIELD OF THE INVENTION

The present invention relates generally to fabrication of multi-material structures, including biomimetic or other advanced structures, such as microfluidic chips of the type used in life science and medical-related research, and more particularly, to a multi-material printer device, and to systems and methods for manufacturing devices with complex structures, such as high-throughput microfluidic screening chips.

Discussion of Related Art

There is a need for the ability to assay compounds for their effects in various chemical processes. Of particular note, in the fields of life science and medical-related research there is a need for the ability to assay compounds on various biological processes. For example, in the pharmaceutical industries, efforts are made to identify compounds that may block, reduce, or even enhance the interactions between biological molecules, as part of the drug discovery process. It is widely-known that such assays (and similar processes in other fields) may be conducted by way of a microfluidic chip, and by flowing one or more components of a biochemical system through one or more reaction channels defined within the microfluidic chip, which may be a biomimetic structure having channels resembling structures (and/or materials) of human organs such as the liver, retina, vein, arteries, etc. depending upon the desired application.

Various materials, processes and devices are known in the art for fabrication of such microfluidic chips. By way of example, existing manufacturing methods such as freeze-drying and salt-leaching have been used, but lack flexibility to tune the channel design regionally. Additionally, photolithography and laser sintering have been used to fabricate more complex geometries with high precision. However, laser sintering techniques suffer from practical limitations in terms of the manufacturing speed and the material composition. With respect to photolithography, common light-assisted three-dimensional (3D) printing systems including continuous digital light processing (DLP), DLP-based 3D printing, mask-projection micro-stereolithography, and dynamic mask stereolithography have been used, and offered some improvement in fabrication speed relative to prior techniques. However, conventional DLP-based techniques are slow and thus their use in fabricating cell-laden constructs with clinically relevant dimensions is very challenging.

Modern drug discovery is limited by the throughput of the assays that are used to screen compounds that possess the desired effects. In particular, screening of the maximum number of different compounds necessitates reducing the time and labor requirements associated with each screen. Accordingly, a high-throughput (rapid) screening molecules and natural products (such as microbial fermentation broths) is thus desirable.

A digital micromirror device (DMD)-based projection printing has emerged as a DLP technique offering great biocompatibility for cell seeding and encapsulation. DMD is a micro-electro-mechanical system that enables a user to control over one million small mirrors to turn on or turn-off on the order of kilohertz (kHz). An ultraviolet (UV) lamp projects high-intensity light on the DMD panel, which patterns the image of each layer of the computer-aided design (CAD) model, and projects onto the bottom side of the container. Following this UV exposure, the photosensitive polymer or hydrogel crosslinks and attaches to the previous layer. DMD-based printing offers the potential for additional improvement in high-quality surface finishing and a variety of material options.

Bioprinting (using bioinks) can be used to fabricate biomimetic biomedical constructs, such as artificial tissues, tissue models, functional biomaterials, biomolecules, biomedical devices, scaffolds, and the like. Recent advances in bioprinting have led to an improved ability to tailor the structural, biological, and/or mechanical properties, which enables fine control of the resulting microarchitecture of the biomedical constructs. Most current bioprinting technologies are limited to the use of a single bioink, making bioprinting a suitable biomedical construct quite time consuming. Although DMD-based DLP projection offers certain manufacturing advantages, several challenges for fabricating biomimetic tissue constructs still remain, including the inability for continuous fabrication of cell-laden constructs with clinically relevant dimensions and the inability to bioprint multi-material/multi-component complex structures with high precision. A core challenge in the use of multiple materials is how to manage material contamination between changing different materials used in the printing process.

Accordingly, what is needed is a printer device capable of using multiple materials to quickly fabricate complex structures, and further, a printer device capable of using multiple bioinks in the rapid manufacture of microfluidic chips, and particularly, high-throughput screening microfluidic chips for high-throughput assaying/testing.

SUMMARY

The present invention provides a multi-material printer device for additive manufacturing of an object. The printer device includes a light projection device configured to emit light in an exposure sequence to selectively cure material to produce the object in the additive manufacturing process. The printer device further includes a motion stage operable to move a build platform relative in coordination with the exposure sequence. Further still, the printer device includes an indexing stage having a work table for supporting at least one material-containing reservoir. The indexing stage is operable to selectively align the build platform with multiple different materials of the reservoir. The multiple materials may be arranged at distinct angular positions within a single reservoir, and the indexing stage may be operable to rotate the work table to align the build platform with different materials during the exposure sequence. Accordingly, the multi-material printer can provide for a quick transition among different materials during a single additive manufacturing printing session on the printer, without a need for exchange of reservoirs, multiple printing sessions with multiple different materials, etc. Accordingly, the multi-material printer can quickly fabricate structures, and can quickly fabricate complex multi-material micro-channel structures, making it suitable for manufacture of high-throughput screening microfluidic chips.

BRIEF DESCRIPTION OF THE FIGURES

An understanding of the following description will be facilitated by reference to the attached drawings, in which.

DETAILED DESCRIPTION

Figure 1:
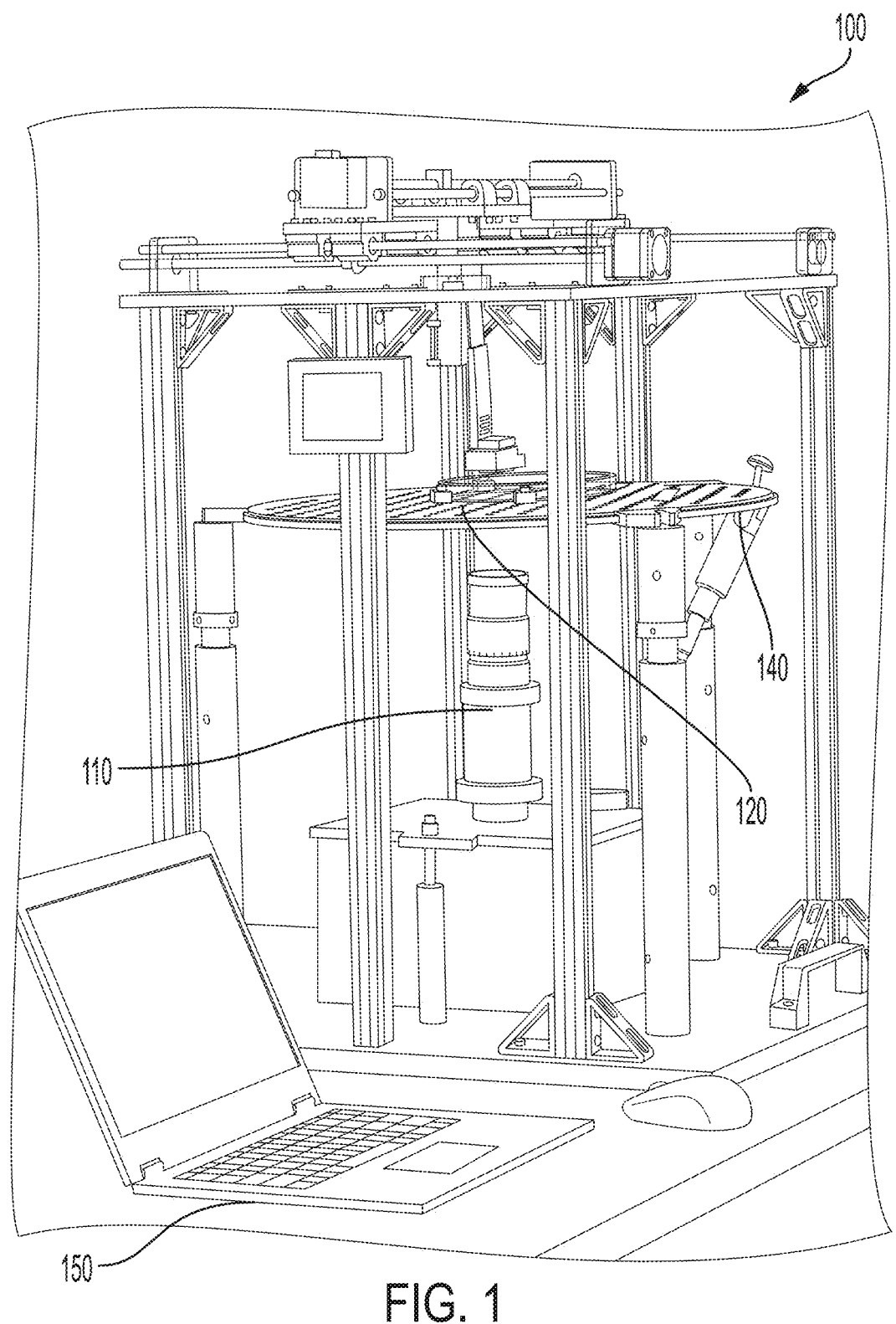
FIG. 1 is a left perspective view of a printer system including a printer device in accordance with an exemplary embodiment of the present invention.

The present invention provides a multi-material printer system, including a printer device, that is capable of acting as a bioprinter using multiple bioinks, to perform a rapid additive manufacturing process, and is suitable for the rapid manufacture of high-throughput screening microfluidic chips (or more particularly, microfluidic chip bodies suitable for combination with fittings and structures to form microfluidic devices) using a single multi-material printing session.

More particularly, the present invention provides a DLP projection-based stereolithography (SLA) approach, which is an additive manufacturing process involving a layer-by-layer based accumulation of materials. Further, the present invention involves use of a DMD-based DLP projection-based SLA (DMD-SLA), and includes the speed-of-manufacture advantages of DMD-SLA described above while also providing for additive manufacturing using multiple different materials, such as bioinks used in producing a hydrogel chip of a microfluidic device, to allow for fabrication of complex structures using multiple materials rapidly, by requiring only a single printing session on the printing device. More particularly, the present invention involves uses of a DMD-based DLP projection-based SLA system, which is similar to a mask-image-projection (MIP) based SLA process in which printing resin/inks/materials flow passively to the exposure, e.g., by gravity or surface tension due to immersion in bath of material. Exemplary mask—image-projection based SLA printing systems, including MIP-SLA and DMD-SLA printing systems, are commercially-available from FormLab, 3D Systems, and EnvisionTec, among others, as well-known in the art.

FIGS. 1-5E show an example of a printer device 100 in accordance with an exemplary embodiment of the present invention. In this embodiment, the printer system is a DMD/DLP-SLA based system. The exemplary printer system 100 is configured as a mask image projection based stereolithography (MIP-SLA) that performs a bottom-up mask image projection based SLA process that is similar to conventional processes, in which the shape of a physical object is fabricated by a series of image projections used to solidify sections of liquid resin, bioink, etc. ("material") held in a reservoir 120.

As an example, multiple mask images may be projected through a DMD projector 110 of the MIP-SLA system 100 at a pre-determined rate, or otherwise in an exposure sequence. The DMD projector 110 can emit light to convey the project the images. As known in the art the light then typically propagates from the DMD projector to a lens that can affect the focus of a light beam, and is subsequently reflected by mirror to be directed towards a bottom surface of the reservoir 120 holding materials to be used in the printing process, which is supported on a work table 140 of the printer system 100. The DMD projector 110, lens, and mirror can operate according to various settings and/or configurations such as a projection distance, frame rate, and focus so as to achieve a desired quality of the projection image within a designated fabrication area of the reservoir 120.

In this exemplary embodiment, the system 120 includes a single-motion stage for actuating mechanical movements of a z-stage 122 (which has a build platform 130 that supports a glass slide 170 or other substrate onto which the desired structure is printed) that can be characterized in a three-dimensional coordinate system (i.e., X axis, Y axis, Z axis) as operable in the z-direction only, to act as the elevator to raise and lower the build platform 130 relative to the reservoir 120. The z-stage may include a precise linear stage for driving the motion along in the Z axis. A motion control board may be used for driving the z-stage 122, a shutter of the projector system, etc. under control of a computer.

The system 120 may include a computer 150 and appropriate software configured to generate a 3D computer-aided design (CAD) model of an object that is then used to generate an image projection sequence suitable for building the desired object via SLA. Thereafter, the image projection sequence can be emitted by the projector to selectively cure liquid material in the reservoir, and to control and/or configured movement of the z-stage 122 and build platform 130, to build the desired physical object. The computer 150 can include a processor, which can be one or more hardware processors, which can each include multiple processor cores. Also, the computer 150 can include a memory, such as volatile and non-volatile memory, for example Random Access Memory (RAM) and Flash RAM. The computer 150 can further include various types of computer storage media and devices, which can include the memory, to store instructions of programs that run on the processor of the computer 150. In certain embodiments, the relevant hardware and/or software of the computer 150 may be integrated into the system/printer device, rather than be incorporated into a stand-along computer as depicted in FIGS. 1-5E.

These aspects of the printer system 100 described above are generally the same or similar to a conventional SLA system, and include optical-based components, mechanical-based components, and other hardware typical of conventional MIP-SLA printers, but certain differences are described in greater detail below.

Figure 5A:
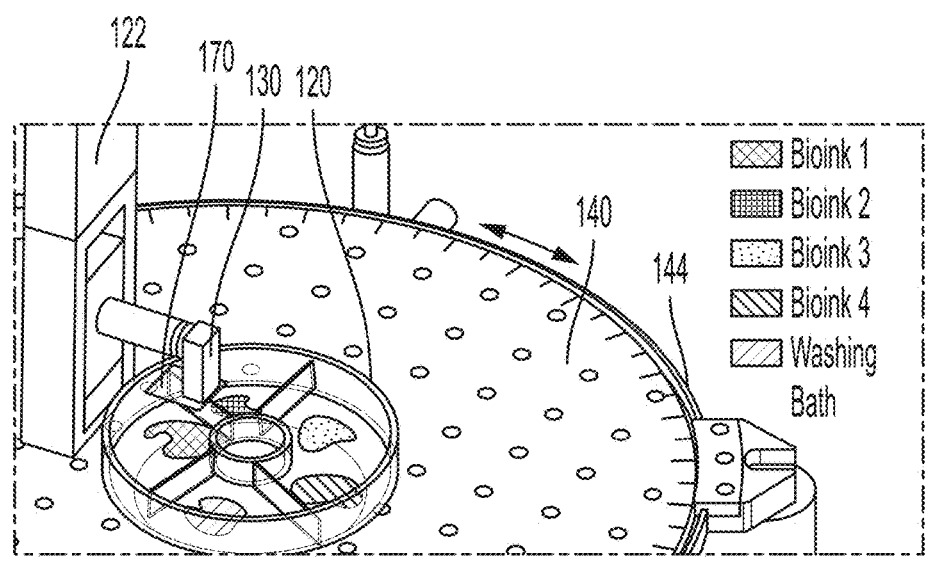
FIG. 5A is another perspective view of the printer device of FIG. 1, showing another enlarged view of the printer's rotary stage.
Figure 5B:
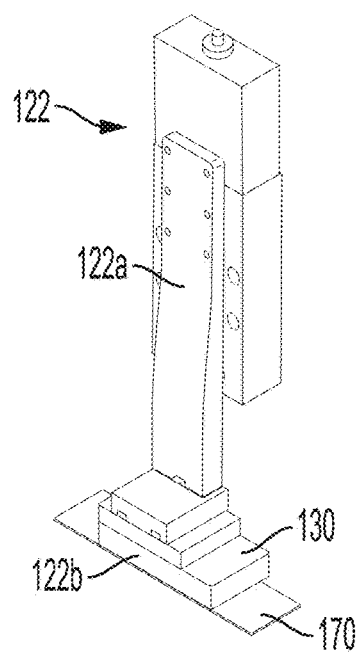
FIGS. 5B-5E are partial perspective view of the printer device of FIG. 1, showing enlarged views of the z-stage and its detachable print head, in accordance with the present invention.
Figure 5C:
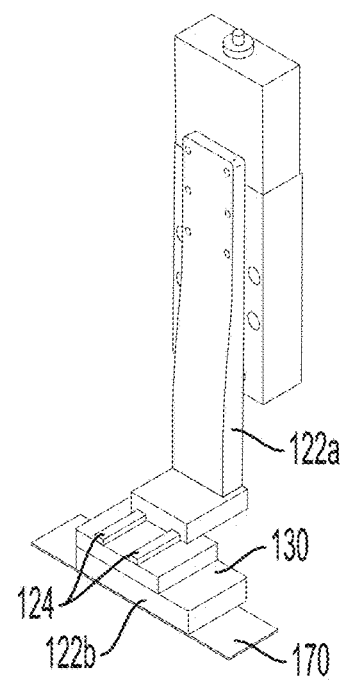

In accordance with the present invention, the printer system 100 further comprises an indexing stage. The indexing stage is operable to align the build platform (and/or the exposure window, light source, etc.) with multiple (different) materials. The different materials may be one or more printing materials and/or one or more intermediate baths/rinses for a built structure. In a certain embodiment, the multiple materials may be housed in distinctly different reservoirs. In a preferred embodiment, the multiple materials are provided as multiple discrete/separate (spaced) droplets within a single reservoir, which may have a form, for example, of a petri dish or a flat sheet of glass or other transparent material. By way of example, FIG. 5A shows a petri-dish style reservoir 120 disposed on the work table 140, positioned above an exposure window 144 (though which light from the projector 110 will pass). The exemplary reservoir 120 contains five distinct droplets of different materials, in this case 4 different bioinks, and one rinsing solution, arranged in a circumferentially spaced arrangement about the reservoir. Preferably, the materials are roughly equally spaced circumferentially about a central axis of the reservoir 120 and/or an axis of rotation of the work table 140. Notably, the axis of rotation of the work table is generally parallel to but spaced from the axis of light projection form the projector 110, such that the reservoir 120/work table 130 can be rotated about its axis to align any selected one of the materials with the light projection axis/z-stage/build platform 130 for SLA layer fabrication.

Figure 2:
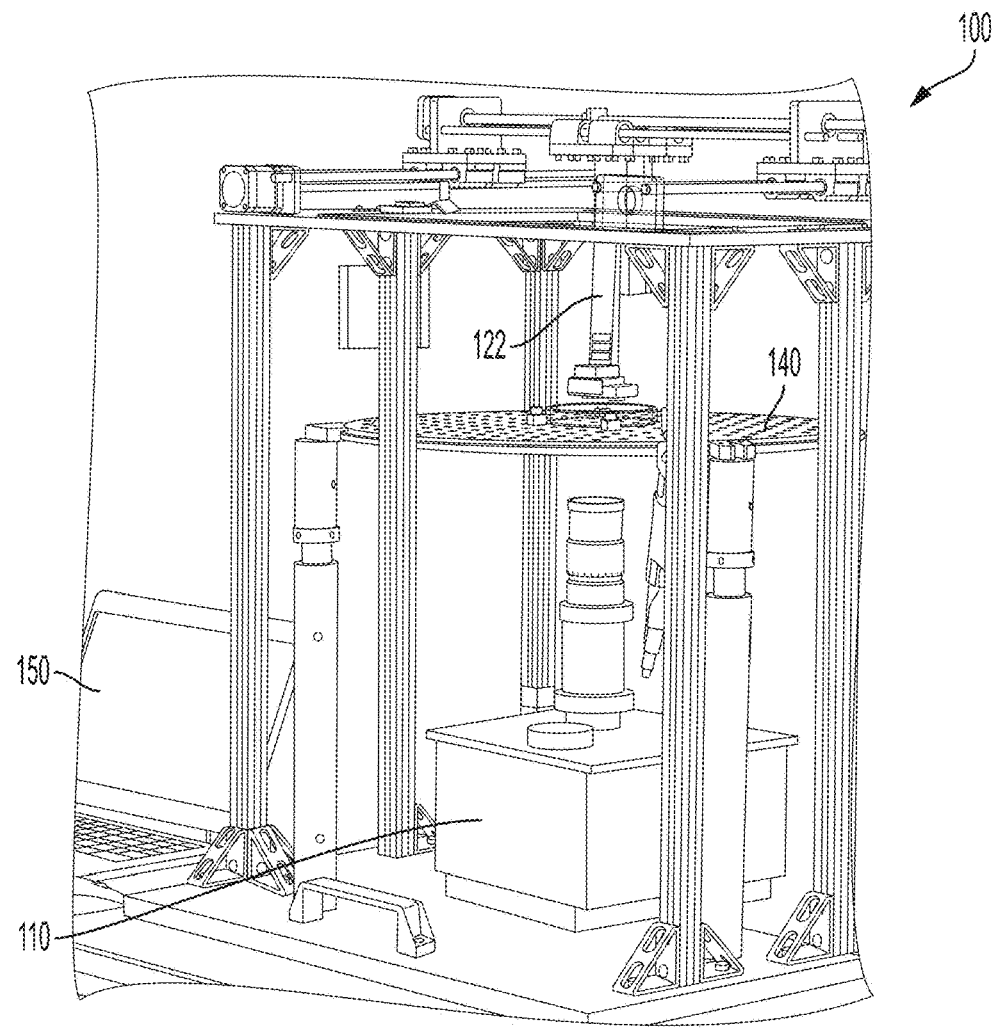
FIG. 2 is a right perspective view of the printer system of FIG. 1.
Figure 3:
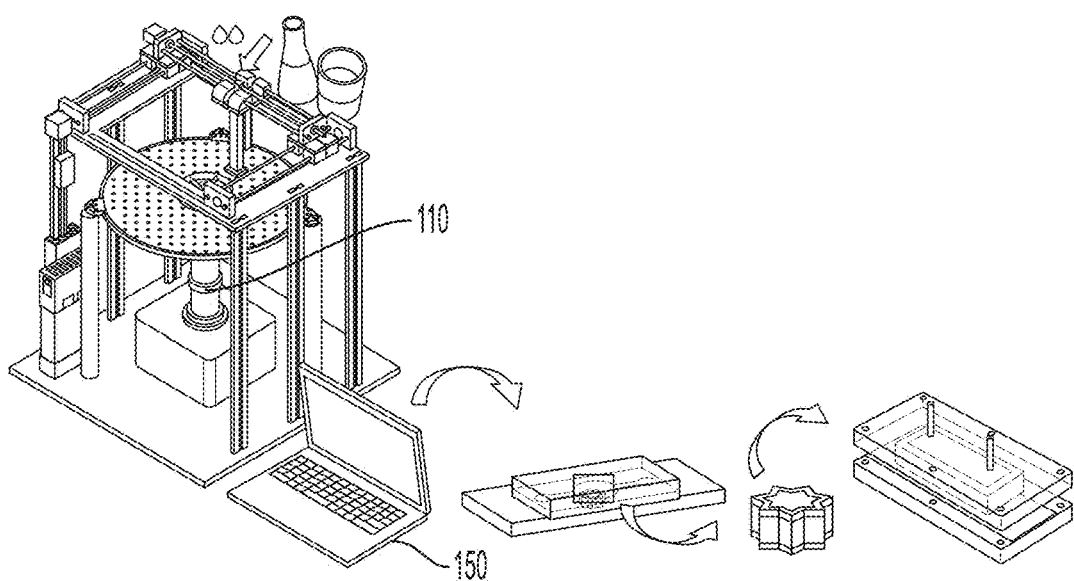
FIG. 3 is a top perspective view of a printer system of FIG. 1.
Figure 4:
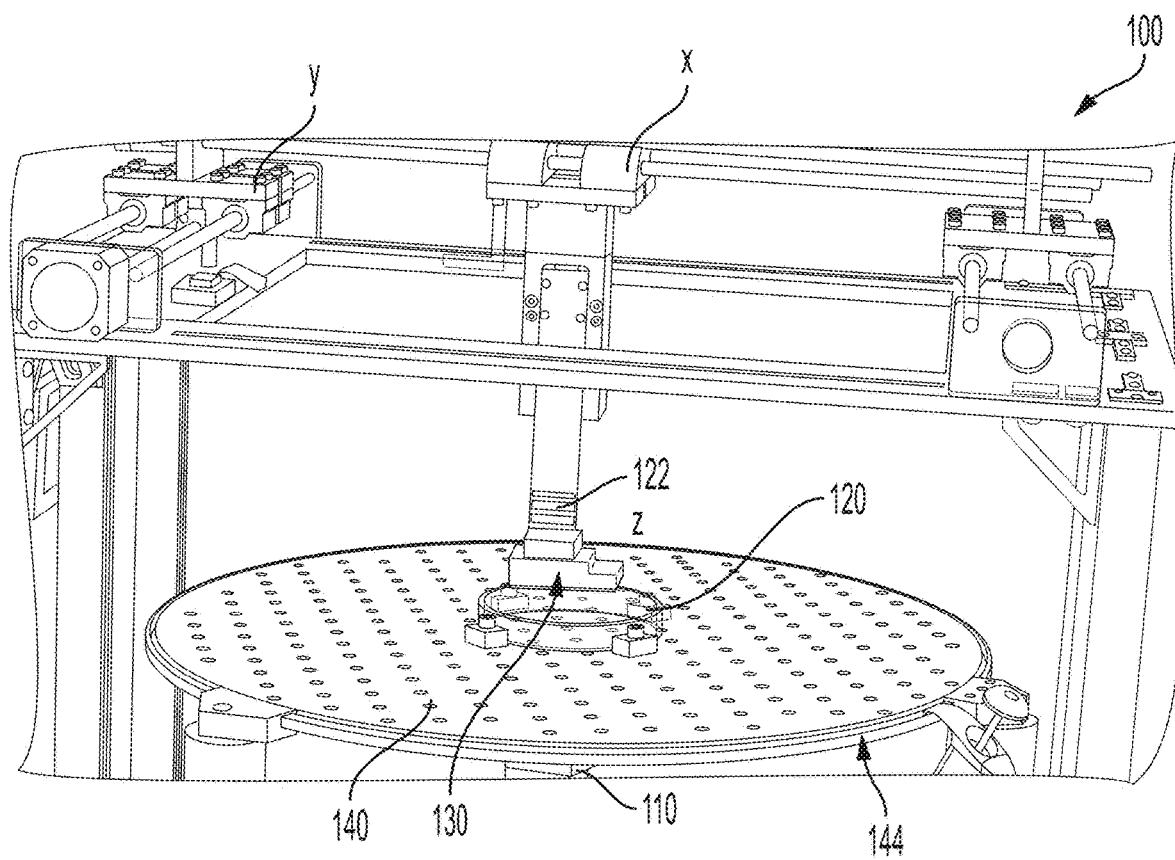
FIG. 4 is a partial perspective view of the printer device of FIG. 1, showing an enlarged view of the printer's rotary stage.

In the exemplary embodiment shown in FIGS. 1-5A, the indexing stage is provided as a rotary stage 160 operable to rotate the reservoir 120 about the light projection axis. In this exemplary embodiment, the rotary stage 160 is configured to rotate the work table 140, and thus rotate the reservoir 130 resting on the work table. As best shown in FIGS. 1-3, the exemplary work table 140 is configured with gear teeth 144 around its periphery and the printer system 100 includes a plurality of supports and/or motors 162 with structures for mating with the work table and/or its teeth, to drive motion of the work table, although it will be appreciated that any suitable structures and mechanism for driving motion may be employed. The rotary stage 160 may include a precise rotary stage for driving angular rotation motion about the Z axis. A motion control board may be used for driving such motion under control of the computer. In accordance with the present invention, the computer 160 and software are configured to determine an indexing sequence reflecting a plurality of different angular positions of the work table, appropriate dwell times, etc., and to control and/or configure movement of the indexing stage 160 in concert with the z-stage 122, etc. to build the desired physical object.

For example, for a reservoir configured with 4 different materials at 4 different positions separated by 90 degrees of angular rotation within the reservoir, the system may cause the indexing stage to rotate the work table 140/reservoir 120 into a first angular position in which a first material (e.g., first bioink) is provided, then to provide a suitable light exposure sequence and z-stage movement to build layers on the build platform 130 with the first material, then rotate the work table 140/reservoir 120 by 90 degrees into a second angular position in which a second material (e.g., second bioink) is provided, then to provide a suitable light exposure sequence and z-stage movement to build layers on the build platform 130 with the second material, then rotate the work table 140/reservoir 120 by 90 degrees into a third angular position in which a third material (e.g., a rinse solution) is provided, then rotate the work table 140/reservoir 120 by 90 degrees into a fourth angular position in which a fourth material (third bioink) is provided, then to provide a suitable light exposure sequence and z-stage movement to build layers on the build platform 130 with the fourth material (third bioink).

In another exemplary embodiment, the rotary stage 160 is configured to rotate the work table 140, and thus rotate the reservoir 120 resting on the work table, but lacks the motors 162 described above, and computer control of the rotation. Rather, the work table 140 is simply supported for rotatable movement, and the table may be rotated manually, by hand, as desired between actuations of the z-stage, to manually index the work table among positions for use of different materials.

In another exemplary embodiment, the work table 140 may be fixed in position, and the indexing stage may be provided as a rotary stage 160 operable to rotate the reservoir 120 about a rotation axis parallel to the light projection axis, with the rotary stage 160 positioned on the work table 140 to cause only the reservoir 130 to rotate, using any suitable gear/motor/drive structure to cause such rotation.

Optionally, additional motion stages may be included, as shown in FIGS. 1-5, for actuating mechanical movements (via an x-stage and y-stage) of the build platform in the x-direction and/or y-direction, although they are not required to practice the present invention in the embodiments described above.

In another exemplary embodiment, the work table 140 may be fixed in position, and the indexing stage may be provided as a rotary stage 160 operable to rotate the z-stage 122. In one embodiment, such a rotary stage may rotate the z-stage 122 such that the build platform 130 rotates into and out of alignment with the light projection axis. This may be suitable, for example, to rotate the build platform into alignment with the light projection axis to build layers using a first material, and then to rotate the build platform out of alignment with the light protection axis to rinse a built structure on the build platform in a rinse solution elsewhere in the reservoir, or outside the reservoir. In this case, it is not required that the build platform be rotated into multiple positions in alignment with a light protection axis.

In another exemplary embodiment, in which the work table 140 is fixed in position, and the indexing stage is provided as a rotary stage 160 operable to rotate the z-stage 122, the rotary stage may rotate the projector with the z-stage 122 such that the build platform 130 rotates and remains in alignment with the light projection axis. In another embodiment, additional projectors may be provided, and/or mirrors, etc. may be used, to ensure alignment of the light protection axis with the build stage both before and after rotation of the z-stage. In these cases, it is possible to perform SLA building at multiple different positions of the build platform relative to the x-y plane.

In another exemplary embodiment, the work table 140 may be fixed in position, and the indexing stage may be provided as a movable, e.g. translatable, stage 160 that does not rotate the z-stage 122, but rather moves it into multiple different positions relative to the x-y plane. In one embodiment, such a movable stage may move the z-stage 122 such that the build platform 130 moves into and out of alignment with the light projection axis. This may be suitable, for example, to rotate the build platform into alignment with the light projection axis to build layers using a first material, and then to move the build platform out of alignment with the light protection axis to rinse a built structure on the build platform in a rinse solution elsewhere in the reservoir, or outside the reservoir. In this case, it is not required that the build platform be rotated into multiple positions in alignment with a light protection axis.

In another exemplary embodiment, in which the work table 140 is fixed in position, and the indexing stage is provided as a movable, e.g., translatable, stage 160 operable to move the z-stage 122, the movable stage may translate the projector with the z-stage 122 such that the build platform 130 moves and remains in alignment with the light projection axis. In another embodiment, additional projectors may be provided, and/or mirrors, etc. may be used, to ensure alignment of the light protection axis with the build stage both before and after movement of the z-stage. In these cases, it is possible to perform SLA building at multiple different positions of the build platform relative to the x-y plane.

Further, in accordance with the present invention, the z-stage 122 includes a primary support member 122a and a detachable print head 122b, as best shown in FIGS. 5B-5E. The detachable print head 122b defines the build platform 130, which in turn may support a glass slide substrate, e.g., by way of disposable double-sided tape, on which a printed object is built. The support member 122a and detachable print head 122b have complementary structures such that the print head 122b is easily mountable, removable and remountable on the support member 122a, preferably by way of complementary structures, and preferably in a tool-free fashion, as will be best appreciated from FIGS. 5C and 5D. In the exemplary embodiment shown, the print head 122a is provided with parallel ridges 124, keystone-shaped in cross-section, and the support member 122a is provided with parallel grooves 126, keystone-shaped in cross-section and sized to be complementary to and receive the ridges 124 on the print head 122b, as will be best appreciated from FIGS. 5C and 5D. Any suitable complementary structures may be used for this purpose, as will be appreciated by those skilled in the art.

Figure 5D:
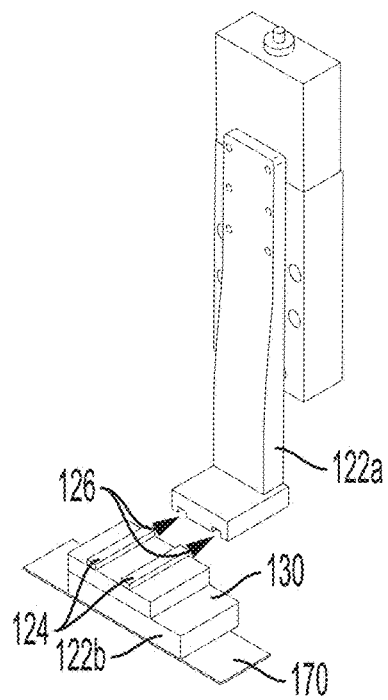
Figure 5E:
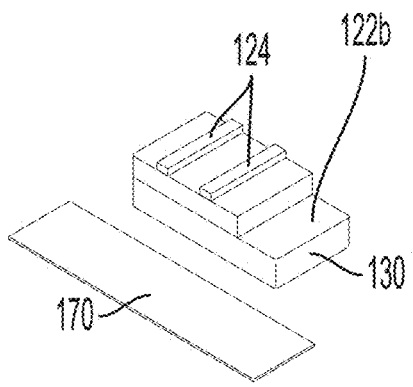

In this manner, the print head 122b/build platform 130 and any glass slide substrate are sufficiently supported on the support member 122a during printing, and after printing, the glass slide and build platform 130/print head 122b are removable together as a unit from the support member 122a, simply by sliding the print head 122b relative to the support member 122a until the ridges 124 exit the grooves 126, as shown in FIG. 5D. Subsequently, the build platform 130 may be removed from the print head 122b, as shown in FIG. 5E. This arrangement allows for easy removal that does not place undue force on the support member 122a or its drive mechanism that would or could damage the relatively delicate z-stage precision motor.

Figure 6:
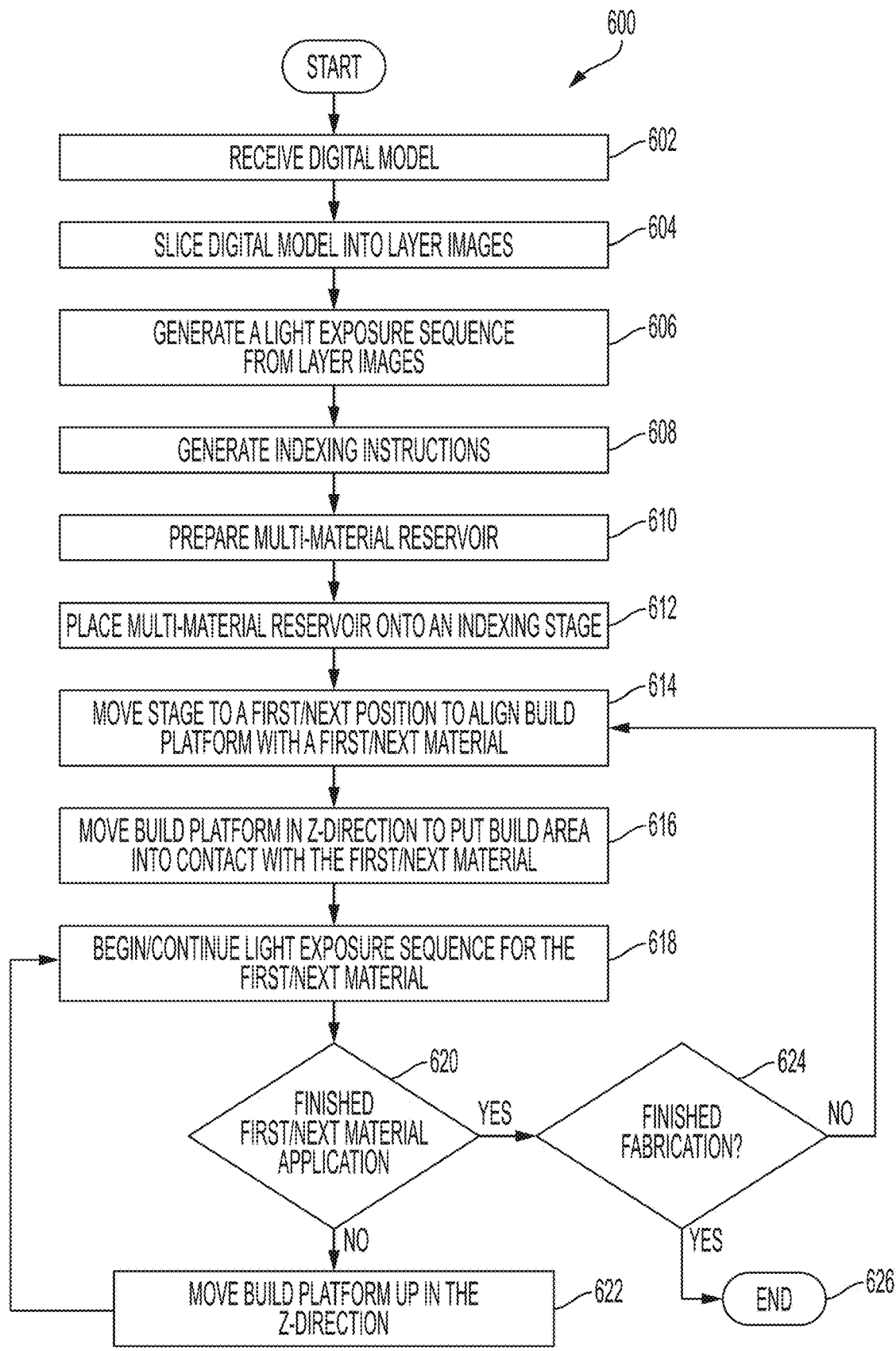
FIG. 6 is a flow diagram illustrating a method for fabrication of a microfluidic chip using the printer system of FIG. 1.

A printer device and/or system in accordance with the present invention may be used for multi-material-based fabrication of a broad range of devices, and is well-suited to fabrication of high-throughput multi-bioink hydrogel microfluidic chip bodies, which may be combined with fittings and/or other structures to form a microfluidic device. FIG. 6 is a flow diagram 600 illustrating an exemplary method for multi-material fabrication of a microfluidic chip (or other device) using the printer system 100 of FIGS. 1-5. Referring now to FIG. 6, the exemplary method beings with receipt of a digital model, as shown at 602. This may involve, for example, receipt at the printer system of a three-dimensional CAD model and/or CAD file reflecting a model of the object desired to be fabricated. This may also involve, for example, creating of such a 3-D model/file at the printer system. Such a model/file may be received and/or produced in a generally conventional fashion, using conventional CAD hardware and software or techniques or conventional software adapted to account for the use of different materials, as will be appreciated by those skilled in the art, for example, via computer 150.

Next, the method involves slicing the digital model into layer image for the purposes of layer-based manufacture using SLA additive manufacturing techniques, as shown at 604. Conventional SLA manufacturing hardware and software or techniques may be used for this purpose, as will be appreciated by those skilled in the art, for example, via computer 150.

Next, the method involves generating a light exposure sequence from the layer images, as shown at 606. Conventional SLA manufacturing hardware and software or techniques may be used for this purpose, as will be appreciated by those skilled in the art, for example, via computer 150.

In accordance with the present invention, the method next involves generating an indexing instruction sequence for indexing the build platform 130 and/or work table 140 and/or reservoir 120 (e.g., build platform/z-stage, x-stage, y-stage, indexing stage, rotary stage, etc.), as shown at 608. The indexing instruction sequence includes instructions to cause the printer system 100 to register a build area of the build platform 130 with different materials between successive SLA build operations involving operation of the z-stage in the z-direction.

This requires conventional computer hardware, e.g., computer 150, and modified/special-purpose SLA manufacturing software this purpose. This requires coordination of the precise printer structure (e.g., rotary work table vs. rotary z-stage, etc.) materials to be used, the number of materials to be used, the structure and/or position of the reservoir(s), preparation of the reservoirs with desired materials in expected locations relative to the reservoir, etc., and can be achieve via inputs to and/or outputs from the computer 160 and associated software. This may be coordinated via a graphical user interface for receiving inputs and/or displaying outputs via the computer 160 or another interface.

For example, for a desired part to be constructed using 4 different materials, it may be determined that a multi-material reservoir needs to be prepared in which supplies/droplets of the 4 different materials are provided in the reservoir at 4 different positions separated by 90 degrees of angular rotation within the reservoir, and thus the indexing instruction sequence may be prepared, for example, to cause the indexing stage to rotate the work table 140/reservoir 120 into a first angular position in which a first material (e.g., first bioink) is provided to allow for building of layers on the build platform 130 with the first material, then to cause the indexing state to rotate the work table 140/reservoir 120 by 90 degrees clockwise into a second angular position in which a second material (e.g., second bioink) is provided to allow for building of layers on the build platform 130 with the second material, then to cause rotation of the work table 140/reservoir 120 by 90 degrees clockwise into a third angular position in which a third material (e.g., a rinse solution) is provided, if rinsing is desired, then to cause rotation of the work table 140/reservoir 120 by 90 degrees clockwise into a fourth angular position in which a fourth material (third bioink) is provided to allow for building of layers on the build platform 130 with the fourth material (third bioink).

Next, the method involves preparation of the multi-material reservoir 130, as shown at 610. This may be performed by machine or manually, and may be performed with or without involvement of the printer device 100. The reservoir, and material droplets, etc. can then be prepared consistent with the fabrication plan and indexing instruction sequence, e.g., to provide material 1 at an angular position of 0 degrees within/on the reservoir, material 2 at an angular position of 90 degrees in a counterclockwise direction from material 1 within/on the reservoir, etc., so that the materials will be in the expected positions when the predetermined indexing is performed by the printer device.

Next, the method includes placement of the multi-material reservoir 130 onto the printer 100 in an operative location on the indexing stage (which may include a rotating work table to stage), as shown at 612, which in the example of FIGS. 1-5 is on the rotating work table 140. It may be required to place the reservoir in a desired/expected orientation, e.g., location and/or angular position, or to calibrate the printer/work table/indexing stage to a particular angular position or home position, so that the materials are in the locations expected by the printer.

Figure 7:
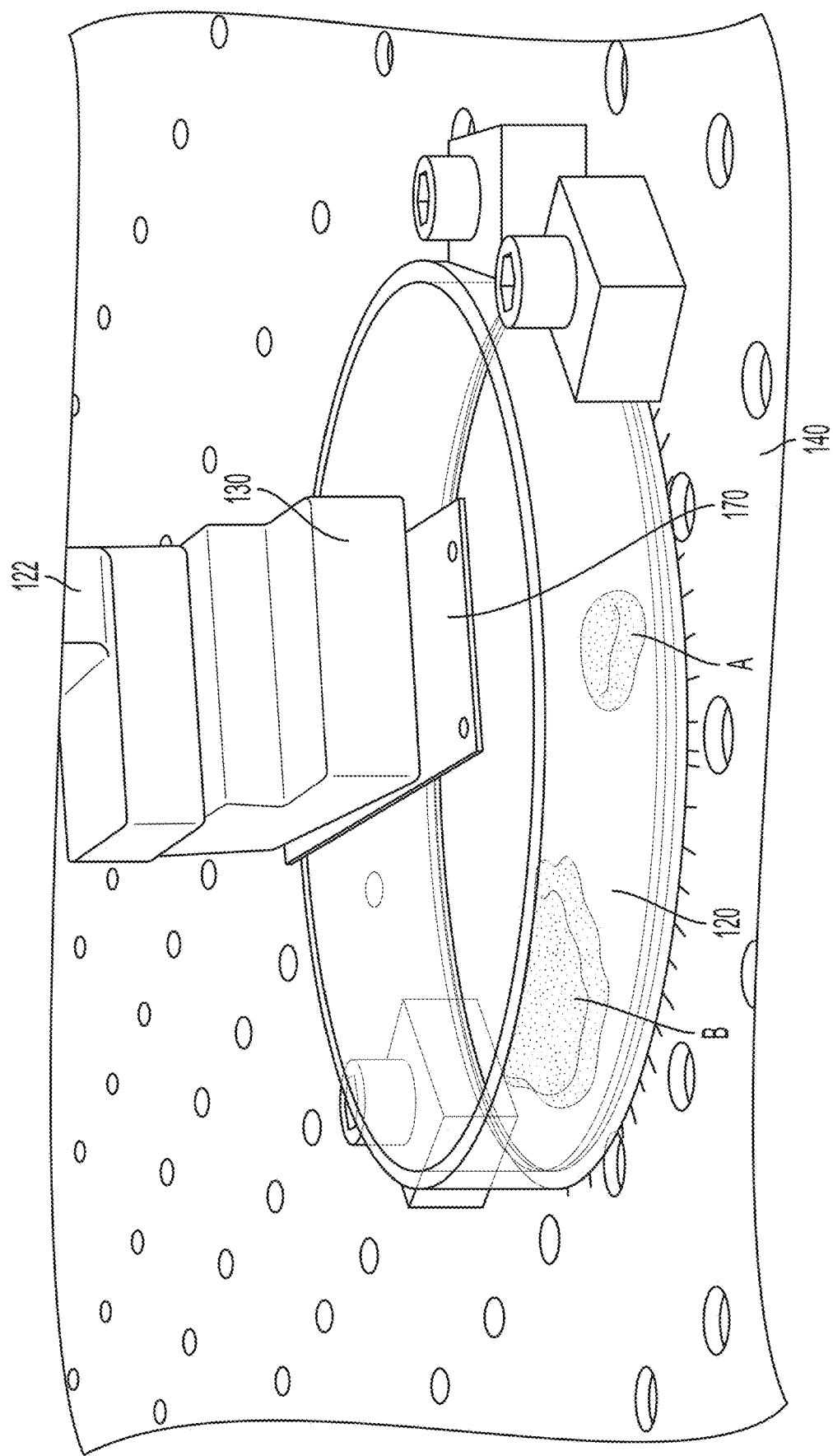
FIG. 7 is a partial side view of the printer's rotary stage in use to fabricate a microfluidic device, showing the rotary table in a first angular position in which a first material held in a multi-material reservoir positioned on the printer's rotary stage is aligned with a build area and a light source.

Next, with a slide or other substrate mounted to the build platform 130 (collectively referred to herein as the "slide"), the indexing stage/work table 140 is indexed to a first position with a first material in the reservoir 120 aligned with light from the light source, as shown at 614. In this example, which involves a printer device 100 having a rotating indexing stage/work table 140, this involves rotating the rotary stage/work table 140. FIG. 7 is a partial side view of the printer's rotary stage 140 in use to fabricate a microfluidic device, showing the rotary table 140 in a first angular position in which a first material A held in a multi-material reservoir 120 positioned on the printer's rotary stage 140 is aligned with a build platform and a light source. The build platform 130 and z-stage 122 are positioned well above the reservoir in a position that is inoperative for building a structure on the slide using DMD-SLA. This indexing/rotating may be done manually in certain embodiments, but in this embodiment, it is done by causing the motor (s) 162 to be driven to drive the work table 140 by way of engagement of the motor's 162 drive gear with teeth 144 on the periphery edge of the work table 140. This is done in accordance with the indexing instructions, under control of the computer and a suitable I/O and/or control board. In certain embodiments in which the reservoir is initially positioned on the work table 140 such that the first material is suitably aligned with the light source and an aperture/window in the work table, indexing/rotation of the first material may not be required to achieve the desired alignment. At this point, the first material is aligned with the DMD-DLP projector, and DMD-SLA may be conducted in a conventional manner to build layers on the slide supported on the build platform 130. By way of example, a work table having a printing aperture/window of approximately 19 mm×approximately 12.1, and use of light having a wavelength of approximately 380 nm, and a light intensity of approximately 0.7 W.cm-2 at the focal plane has been found suitable for the printing process.

Figure 8:
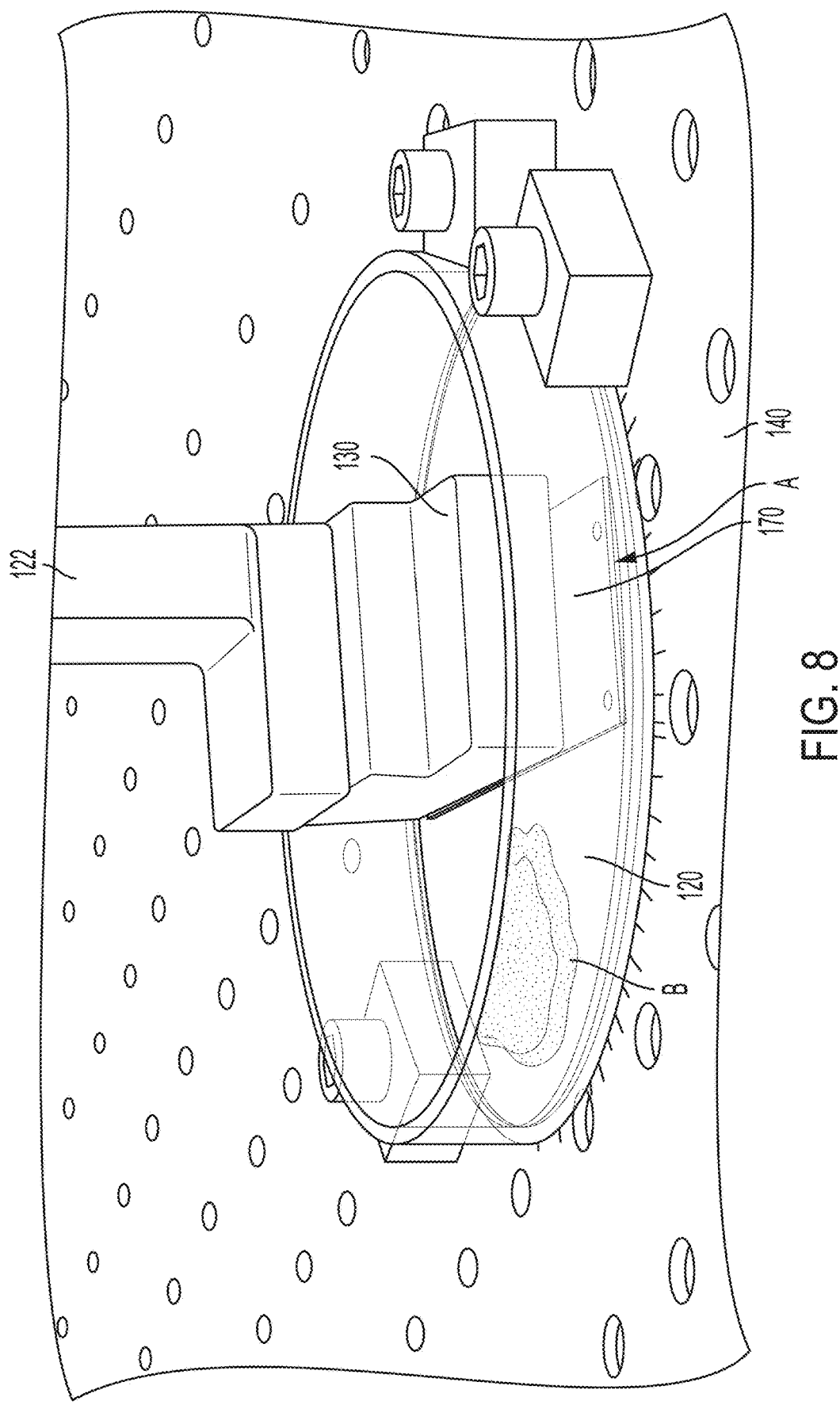
FIG. 8 is a partial side view of the printer's rotary stage of FIG. 7, showing the rotary table in the same first angular position, with the build platform lowered into a position in which a build area is in contact with the first material of the multi-material reservoir.

Accordingly, the method next involves moving the build platform 130 in the z-direction (e.g., downwardly) to put the slide into contact with the first material A in the reservoir 120, as shown at 616. FIG. 8 is a partial side view of the printer's rotary stage 140 of FIG. 7, showing the rotary table 140 in the same first angular position as that shown in FIG. 7, with the build platform 130 lowered into a position in which the slide's build area is in contact with the first material A of the multi-material reservoir 120. This Z-direction movement of the z-stage 122 is done under control of the computer and a suitable I/O and/or control board. Because the build platform (or a portion thereof, and a supported slide or portion there) is aligned with the DMD-DLP projector, it is in position to be exposed to light therefrom, and therefore to build layers thereon in a DMD-SLA additive manufacturing process.

Next, the printer begins (or continues) to provide a light exposure sequence by selectively operating the light source to build layers, as shown at 618. As will be appreciated by those skilled in the art, the light exposures are provided in coordination with operation of the DMD mirror assembly, to provide a sequence of projected images into/onto the first material, in a manner consistent with conventional DMD-SLA processes. This is done under control of the computer and a suitable I/O and/or control board, and may be done in a conventional manner. As will be appreciated by those skilled in the art, the series of project images correspond to the series of layers desired to be built on the slide via the DMD-SLA process. The light exposure sequence may involve a series of projected images separated in time by a predetermined interval, during which the build platform 130 and slide may be moved to prepare for building of the next layer, as will be appreciated by those skilled in the art.

Figure 9:
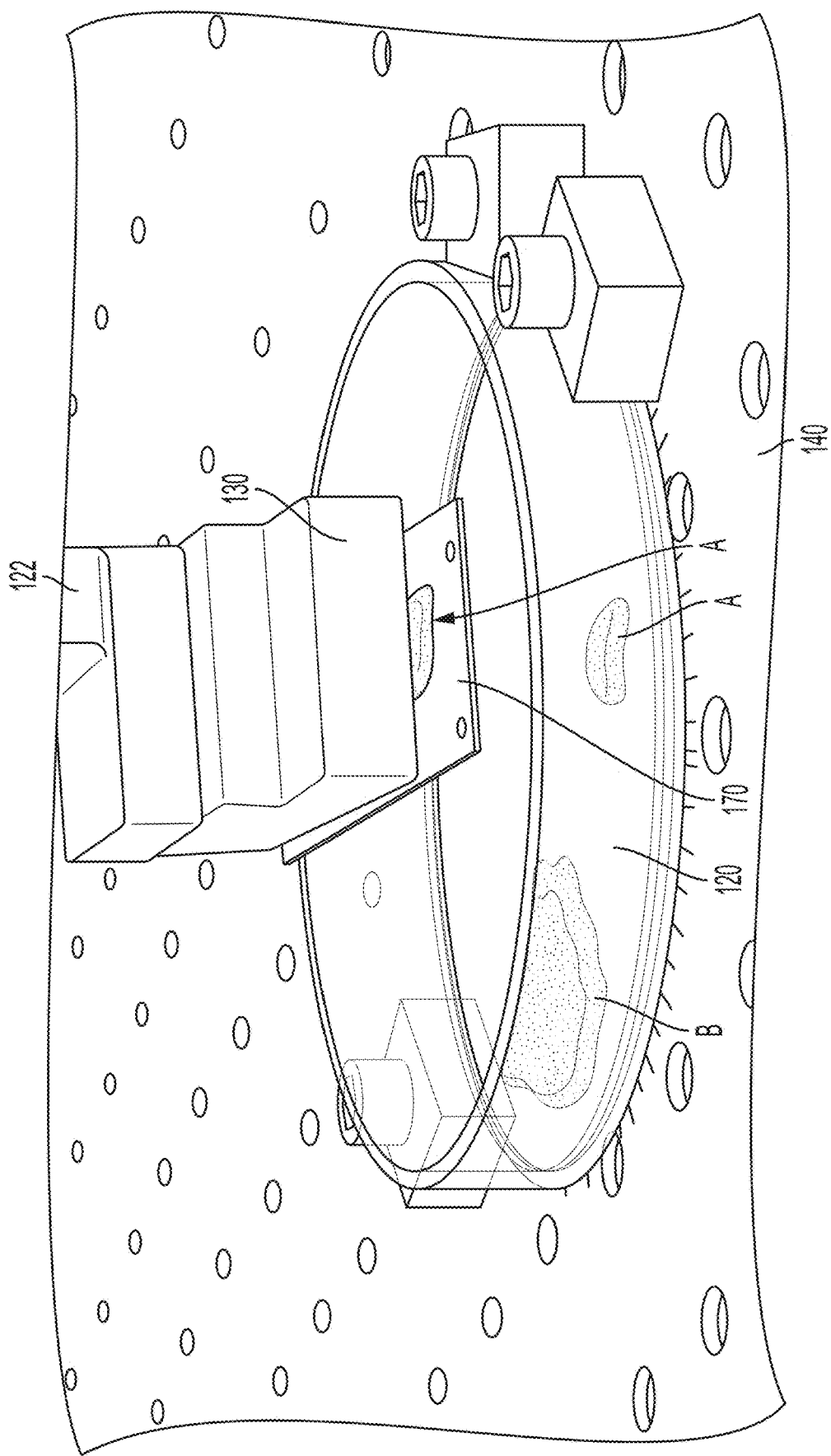
FIG. 9 is a partial side view of the printer's rotary stage of FIG. 7, showing the rotary table in the same first angular position, with the build platform raised from the position shown in FIG. 8, after contact of the build area with the first material of the multi-material reservoir.

It is then determined whether depositing of layers with the first material, according to the layers of the digital model for the part to be printed, is finished, as shown at 620. If not, then the build platform 130 is moved in the z-direction, as shown at 622, namely, upwardly in the bottom-up SLA build process, and flow returns to 618 where a next light exposure is provided. This movement of the z-stage in the z-direction is done under control of the computer and a suitable I/O and/or control board, and may be done in a conventional manner. This continues until the building of layers using the first material has been completed. FIG. 9 is a partial side view of the printer's rotary stage 140 of FIG. 7, showing the rotary table 140 in the same first angular position as that shown in FIG. 7, with the build platform 130 raised from the position shown in FIG. 8, after contact of the slide with the first material A of the multi-material reservoir 120. At this point, a structure has been fabricated from the first material A on the slide.

Figure 10:
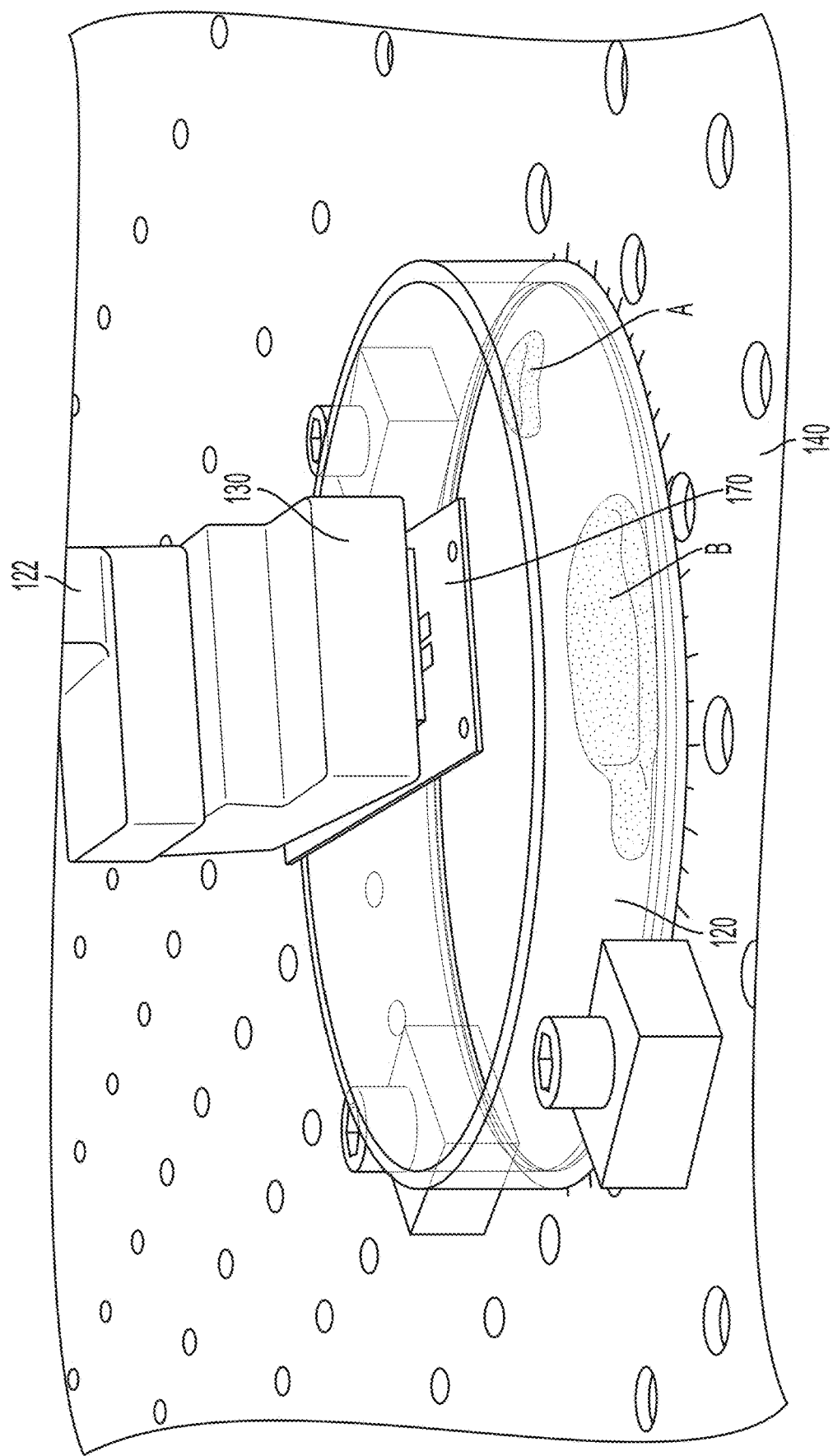
FIG. 10 is a partial side view of the printer's rotary stage in use to fabricate a microfluidic device, showing the rotary table in a second angular position in which a second material held in the multi-material reservoir positioned on the printer's rotary stage is aligned with the build area and the light source.

If it is determined at 620 that fabrication using the first (or next) material is completed, then it is next determined whether fabrication of the part is finished, according to the digital model for the part to be printed, as shown at 624. If not, flow returns to 614, and the indexing stage is moved/indexed to a next position, so that the build area of the slide is aligned with a second material. FIG. 10 is a partial side view of the printer's rotary stage 140 in use to fabricate a microfluidic chip, showing the rotary stage 140 in a second angular position different from the first angular position (e.g., separated by 90 degrees of clockwise rotation of the reservoir 120) in which a second material B held in the multi-material reservoir 120 positioned on the printer's rotary stage 140 is aligned with the slide supported on the build platform, and in this case, the light source. For certain parts, this may be a rinse material, provided in the same reservoir, or outside the reservoir. For other parts, this may be a next material for building next layers of the part, as in this example. In this example, this involves rotating the work table by 90 degrees clockwise, until the second material is aligned with the light source. The printer is then ready to build additional layers by DMD-SLA using the second material.

Figure 11:
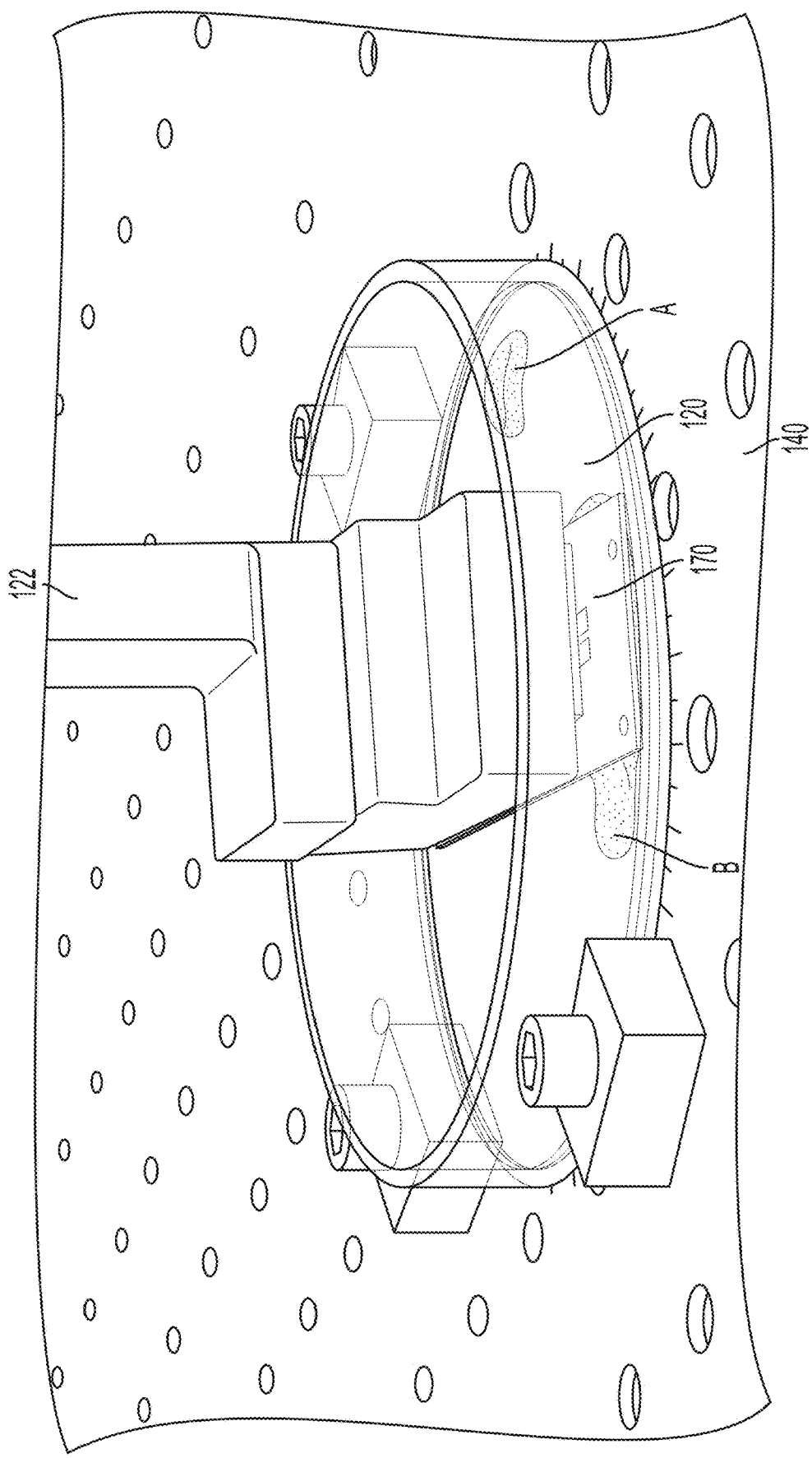
FIG. 11 is a partial side view of the printer's rotary stage of FIG. 10, showing the rotary table in the same second angular position, with the build platform lowered into a position in which the build area is in contact with the second material of the multi-material reservoir.

Accordingly, the build platform is then moved downwardly in the z-direction to put the build area of the slide into contact with the next material, as shown at 616, and a next light exposure sequence is begun that corresponds to building layers using the next material while the build platform is moved upwardly in the z-direction, and this continues until fabrication of materials using the second material is complete, as shown at 616-622. FIG. 11 is a partial side view of the printer's rotary stage 140 of FIG. 10, showing the rotary stage 140 in the same second angular position as that shown in FIG. 10, with the build platform 130 lowered into a position in which the slide is in contact with the second material B of the multi-material reservoir 120.

Figure 12:
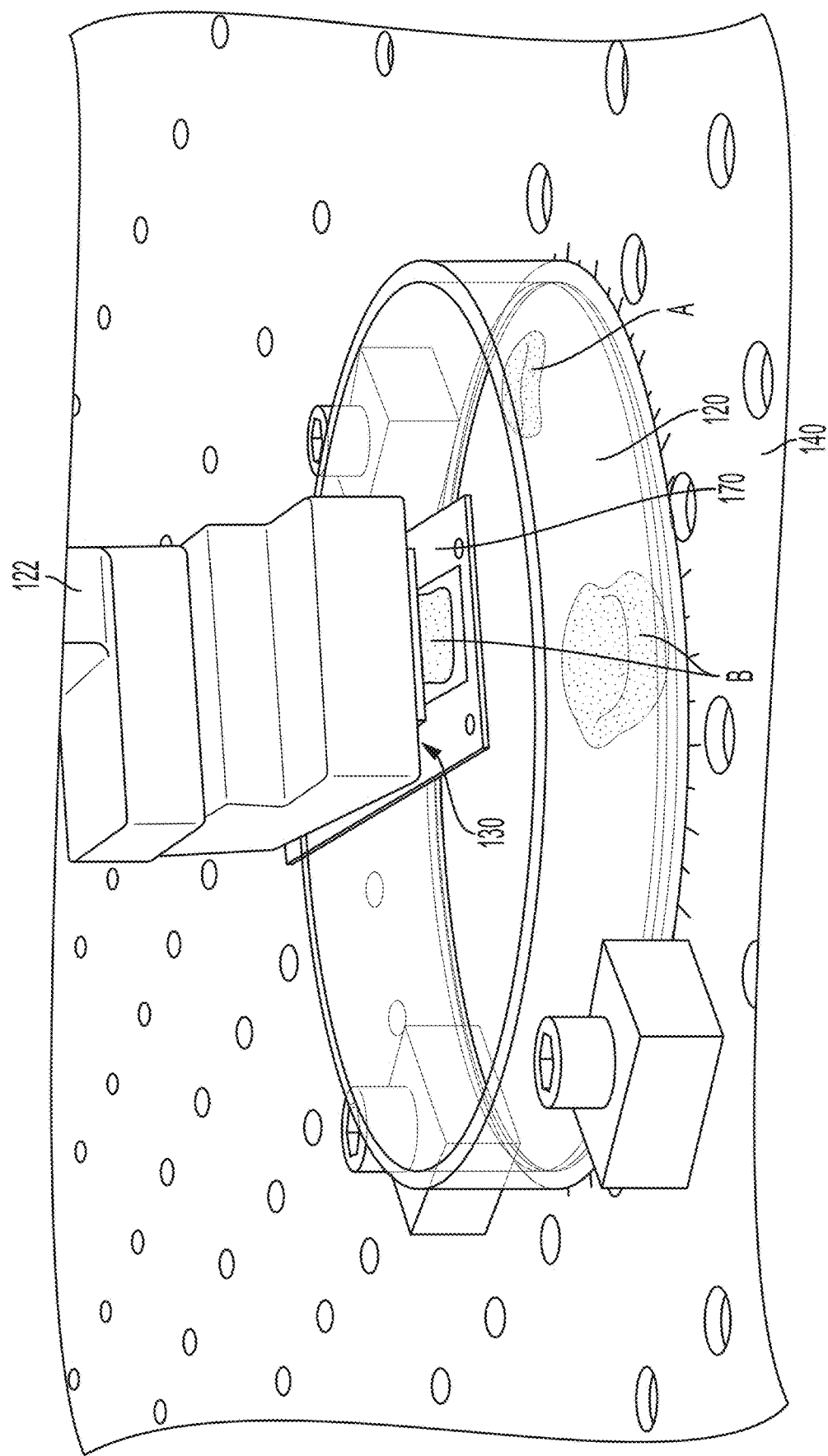
FIG. 12 is a partial side view of the printer's rotary stage of FIG. 10, showing the rotary table in the same second angular position, with the build platform raised from the position shown in FIG. 11, after contact of the build area with the second material of the multi-material reservoir.

After fabrication of layers with the second material is complete, it is then determined if part fabrication is complete, as shown at 624. This continues until the part is complete, as described above. FIG. 12 is a partial side view of the printer's rotary stage 140 of FIG. 10, showing the rotary stage 140 in the same second angular position as that shown in FIG. 11, with the build platform 130 raised from the position shown in FIG. 11, after contact of the slide supported on the build platform 130 with the second material B of the multi-material reservoir 120. As can be seen in FIG. 12, a structure has been fabricated on the slide that is constructed of layers of the first material and layers of the second material.

Figure 13:
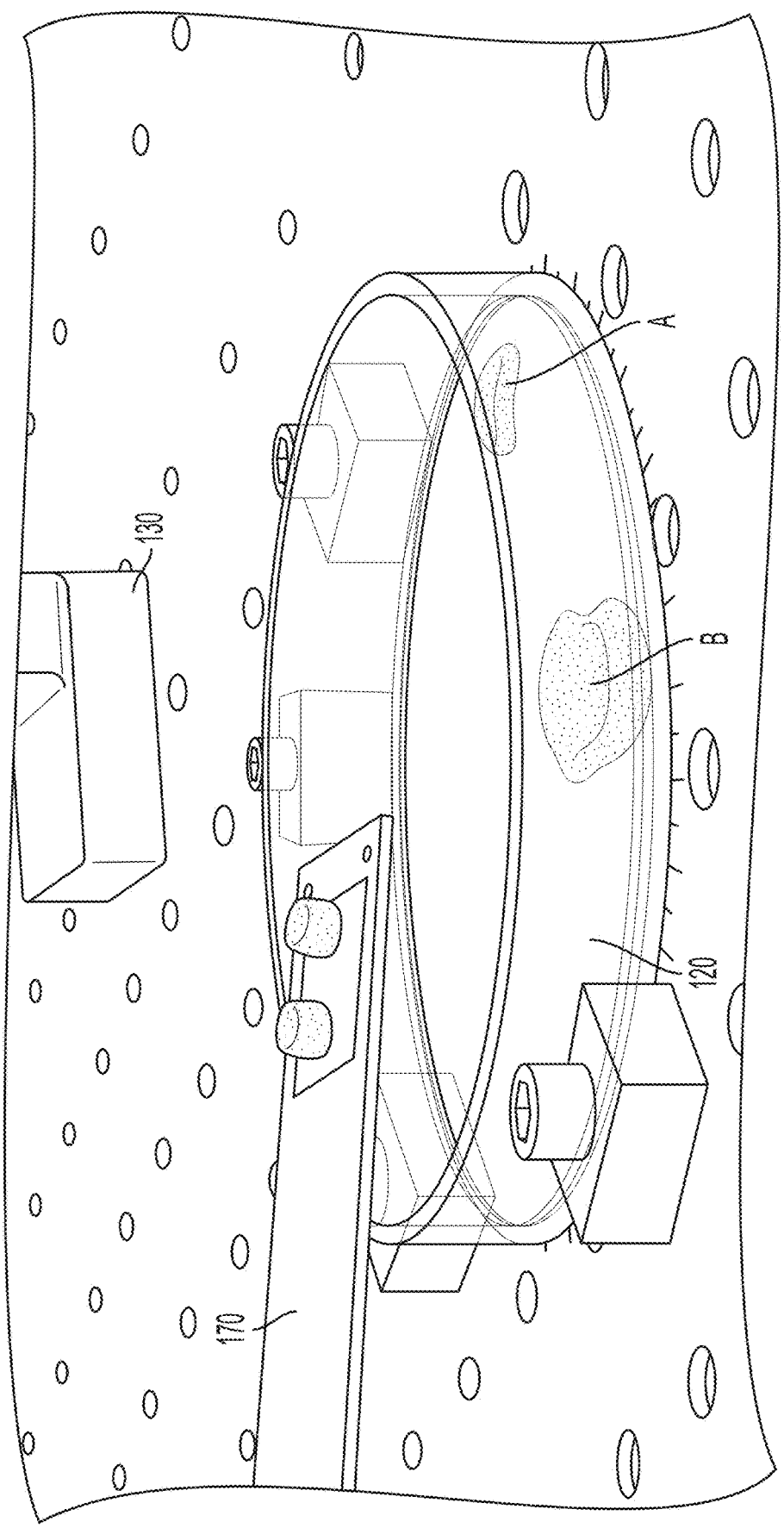
FIG. 13 is a perspective view of an exemplary microfluidic chip body built via DMD-based DLP projection stereolithography as shown in FIGS. 7-12 on a slide supported by the build platform.

If it is determined that part fabrication is complete, then the method ends, as shown at 626, and the slide and fabricated part may be removed from the printer. FIG. 13 shows an exemplary microfluidic chip body 180 built on the slide via DMD-based DLP projection stereolithography as shown in FIGS. 7-12.

Accordingly, it should be appreciated that a printer device is provided that is capable of using multiple materials to quickly fabricate structures, by provide multiple materials within the reservoir or otherwise with the operating area of the printer, and simply indexing/moving the build platform and/or reservoir to allow for rinse steps and/or SLA layer-building steps as needed, and that this multi-material SLA manufacture, including fabrication of parts using multiple different materials, may be performed during a single printing session on the printer, without the need to remove the build platform, or the need to refill or replace a material reservoir, during part fabrication. By using DMD-SLA, the present invention enjoys relatively rapid fabrication speeds, but it is particularly rapid as a multi-material, single printing process fabrication method. Further, by using DMD-SLA, the printer device is capable of manufacturing complex structures quickly, on a small scale, and with precision. Further still, the printer is capable of acting as a printer, using multiple different bioinks, in the rapid manufacture of microfluidic chips, and particularly, high-throughput screening microfluidic chips including multiple, fine-scale channels and/or multiple bioink materials, for high-throughput assaying/testing.

Figure 14:
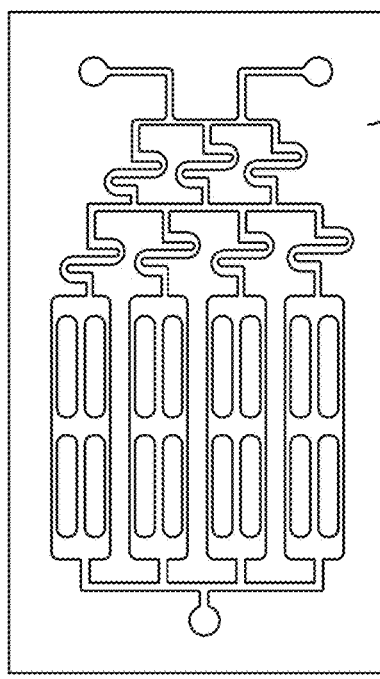
FIG. 14 is a plan view of another exemplary microfluidic chip body built via DMD-based DLP projection stereolithography, consistent with FIGS. 7-12.
Figure 15:
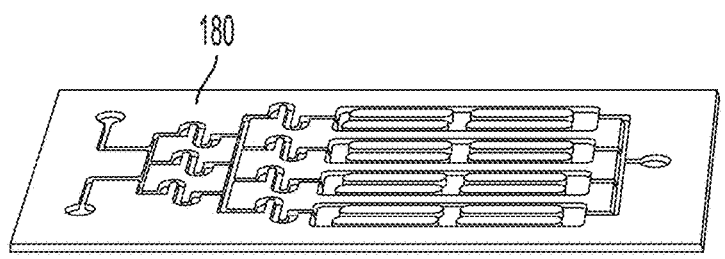
FIG. 15 is a perspective view of the microfluidic chip body of FIG. 14.

FIGS. 14 and 15 show another exemplary microfluidic chip body 180 built via DMD-based DLP projection stereolithography, consistent with the process described above and shown in FIGS. 7-12. Accordingly, these microfluidic chip bodies were produced in a single printing process/session, using multiple different bioinks, and thus were produced relatively rapidly compared to prior art processes and approaches. Further, microfluidic chip bodies produced in this manner have a high potential for use as a high-throughput microfluidic chip body with hydrogel based bioink-1 as a multi-channel microfluidic chip 186. Rectangular structure (181, 182, 183, 184) within a microfluidic chip body using bioink-2 (or multiple bioink materials) may be bioprinted with different mechanical properties for resembling different compositions of bodily tissue and organs while the many different channels (with different material properties and/or different structures) can be used to screen many different doses of drugs at a high rate and release of drugs into cell laden regions. Such a multi-material high-throughput microfluidic chip body can be combined with fittings and fixtures to form a corresponding microfluidic device that is suitable for use in a broad range of drug development, in-vitro diagnostics, biotechnology, and ecology applications. Microfluidic chips (and devices) manufactured in accordance with the present invention may be similar in structure to those manufactured by other processes, but those chips may be manufactured much more rapidly by printing via the printing device of the present invention. Further, microfluidic chips (and devices) manufactured via the printing device of the present invention may be manufactured to have greater capacity, as a hydrogel-based system, than many other chips manufactured by other processes.

Figure 16:
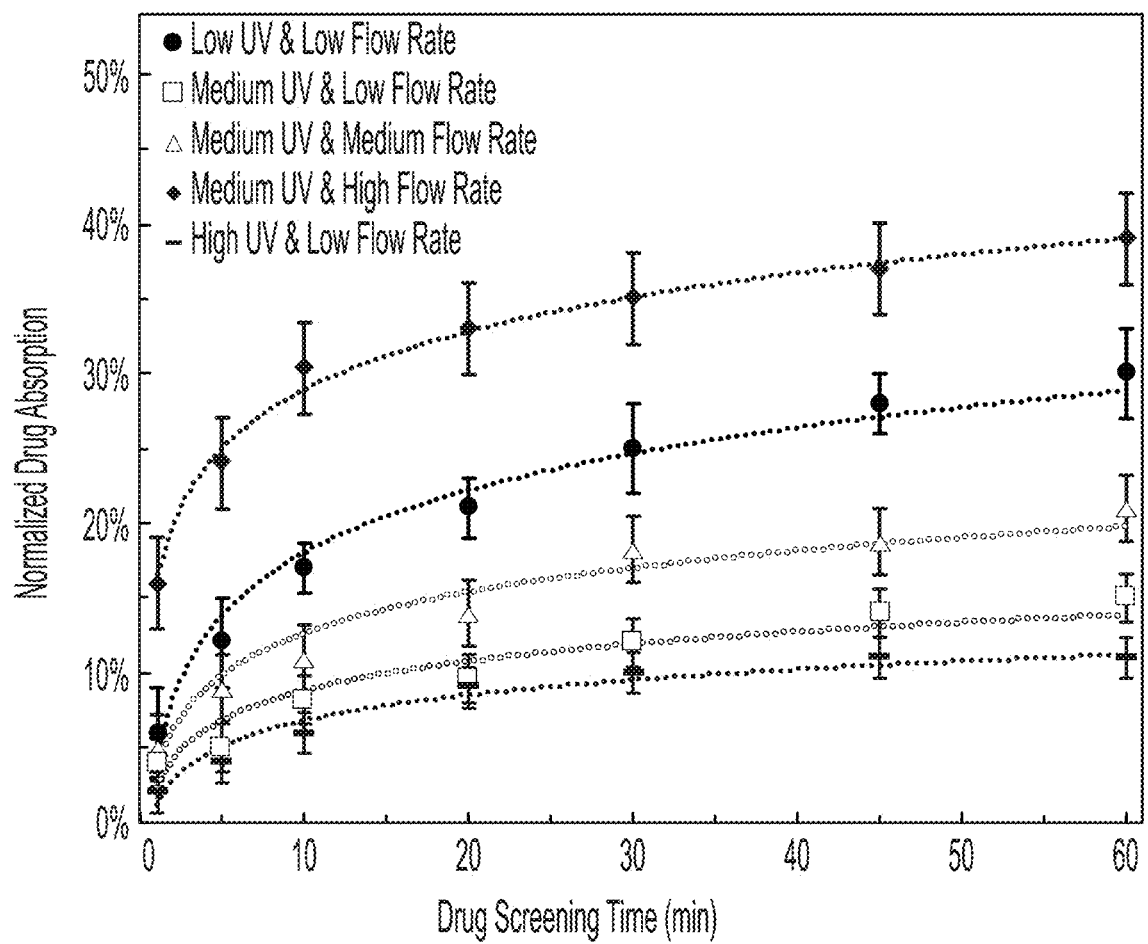
FIG. 16 is a graph showing diffusion data in the nature of normalized drug absorption plotted against drug screening time for a variety of microfluidic devices including microfluidic chip bodies procedure in accordance with the present invention.

FIG. 16 is a graph showing diffusion data in the nature of normalized drug absorption plotted against drug screening time for a variety of microfluidic devices including microfluidic chip bodies procedure in accordance with the present invention. More particularly, FIG. 16 charts exemplary diffusion data for an example in which Bovine Serum Albumin (drug) was released into a gelatin methacryloyl chip body (printed in accordance with the present invention) over time for different flow rates. More particularly, a low flow rate of 0.7 uL/min, a medium flow rate or 1.5 uL/min, and a high flow rate of 15 uL/m in were used. In the chart, low UV means a relatively low UV exposure time (e.g., 2 seconds per 200 micron layer), medium UV means a relatively moderate UV exposure time (e.g., 3 seconds per 200 micron layer), and high UV means a relatively high UV exposure time (e.g., 4 seconds per 200 micron layer).

As will be appreciated from FIG. 16, this diffusion experiment example shows the application of an exemplary hydrogel-based microfluidic chip body, produced according to the method described herein, for testing different concentrations and rates of drugs in the market, and thus suitability as a high-throughput screening microfluidic chip/device for release-based drug testing. As will be appreciated by those skilled in the art, a key aspect of high-throughput screening chips is the ability to control the rate of drug-cell interactions. As shown in FIG. 16, this was achieved in the example by controlling the release of particles (drug model) in different chips and at different time points.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A multi-material printer device for additive manufacturing of an object, said printer device comprising:
    an indexing stage having a work table configured to support a reservoir containing a first photocurable material at a first location of the reservoir aligned with a first region of said work table, and a second photocurable material, different from said first photocurable material, at a second location of the reservoir aligned with a second region of said work table, said work table defining a window;
    a light projection device configured to emit light through said window and into the reservoir to cure material contained in the reservoir;
    a motion stage defining a build platform, said motion stage being operable to move said build platform relative to said work table, and selectively into and out of the reservoir positioned on said work table; and
    a drive mechanism operable to drive motion of said work table to a first position in which said first region of said work table is aligned with said window to allow curing of said first photocurable material, and to a second position in which said second region of said work table is aligned with said window to allow curing of said second photocurable material.

2. The multi-material printer device of claim 1, wherein said indexing stage is configured to rotate said work table.

3. The multi-material printer device of claim 2, wherein said work table is circular, and is mounted for rotation about a center of said work table.

4. The multi-material printer device of claim 1, wherein said indexing stage is configured to rotate said work table in a horizontal plane, and wherein said motion stage is operable to move said build platform in a vertical direction.

5. The multi-material printer device of claim 1, further comprising:
    a control system comprising at least one hardware processor and a storage device coupled with said hardware processor, said control system being coupled with said drive mechanism, said light projection device, and said motion stage, said storage device storing instructions executable by said processor to:
    cause said drive mechanism to selectively drive said indexing stage and move said work table to said first position for printing with said first photocurable material and to said second position for printing with said second photocurable material;
    cause said control system to cause said light projection device to emit light into the reservoir in an exposure sequence adapted to cure photocurable material to manufacture the object as supported on said build platform; and
    cause said motion stage to move said build platform, during the exposure sequence, in coordination with the exposure sequence, to build layers of the object from photocurable material.

6. The multi-material printer device of claim 1, wherein said drive mechanism is operable to drive angular motion of said work table.

7. The multi-material printer device of claim 1, wherein said indexing stage comprises a plurality of supports engaging and supporting said work table at a plurality of locations on said work table.

8. The multi-material printer device of claim 1, wherein said indexing stage comprises a rotary stage operable to rotate the reservoir about a vertical axis of rotation parallel to a vertical light projection axis.

9. The multi-material printer device of claim 1, further comprising an additional motion stage for actuating movement of said build platform in a direction transverse to a direction of movement of said motion stage.

10. The multi-material printer device of claim 1, wherein said indexing stage is operable to provide translational movement of said work table in a plane of said work table.

11. The multi-material printer device of claim 1, wherein said motion stage comprises a primary support member and a print head selectively attachable to and detachable from said primary support member.

12. The multi-material printer device of claim 11, wherein said primary support member and said print head are selectively attachable and detachable by way of complementary structures formed on said primary support member and said print head.

13. A multi-material printer device for additive manufacturing of an object, said printer device comprising:
    an indexing stage having a work table configured to rotate said work table about a vertical axis, and to support a reservoir containing a first photocurable material at a first location of the reservoir aligned with a first region of said work table, and a second photocurable material, different from said first photocurable material, at a second location of the reservoir aligned with a second region of said work table, said work table defining a window;
    a drive mechanism operable to drive motion of said work table to a first position in which said first region of said work table is aligned with said window to allow curing of said first photocurable material, and to a second position in which said second region of said work table is aligned with said window to allow curing of said second photocurable material;
    a light projection device configured to emit light through said window and into the reservoir to cure material contained in the reservoir;
    a motion stage defining a build platform, said motion stage being operable to move said build platform in a vertical direction relative to said work table, and selectively into and out of a reservoir positioned on said work table; and a control system comprising at least one hardware processor and a storage device coupled with said hardware processor, said control system being coupled with said drive mechanism, said motion stage, and said light projection device, said storage device storing instructions executable by said processor to:

cause said drive mechanism to selectively drive said indexing stage and move said work table to said first position for printing with said first photocurable material and to said second position for printing with said second photocurable material;

cause said control system to cause said light projection device to emit light into the reservoir in an exposure sequence adapted to cure at least one material to manufacture the object as supported on said build platform; and cause said motion stage to move said build platform, during the exposure sequence, in coordination with the exposure sequence, to build layers of the object from the at least one material.

14. The multi-material printer device of claim 13, wherein said indexing stage comprises a plurality of supports engaging and supporting said work table at a plurality of locations on said work table.

15. The multi-material printer device of claim 13, wherein said motion stage comprises a primary support member and a print head selectively attachable to and detachable from said primary support member.

16. The multi-material printer device of claim 15, wherein said primary support member and said print head are selectively attachable and detachable by way of complementary structures formed on said primary support member and said print head.

17. A method for additive manufacturing of an object using a multi-material printer device comprising an indexing stage having a work table configured to support a material-containing reservoir, said work table defining a window, a light projection device configured to emit light through said window and into the reservoir to cure material contained in the reservoir, and a motion stage defining a build platform, said motion stage being operable to move said build platform relative to said work table, and selectively into and out of any reservoir positioned on said work table, said method comprising:

providing at least one reservoir containing at least two different materials;

placing said at least one reservoir in an operative position on said work table;

moving at least one of said indexing stage and said motion stage to align said build platform with a first material contained in said at least one reservoir;

moving said build platform to place a build area adjacent said build platform into contact with said first material;

operating said light projection device to project light through the window in a first portion of an exposure sequence suitable for manufacture of said object with said first material, in coordination with moving of said build platform to withdraw said build area from contact with said first material;

moving at least one of said indexing stage and said motion stage to align said build platform with a second material contained in said at least one reservoir;

moving said build platform to place the build area adjacent said build platform into contact with said second material; and operating said light projection device to project light through the window in a second portion of an exposure sequence suitable for manufacture of said object with said second material, in coordination with moving of said build platform to withdraw said build area from contact with said second material.

18. The method of claim 17, wherein said moving at least one of said indexing stage and said motion stage to align said build platform with said first material comprises operating said indexing stage to rotate said work table to a first angular position in which said first material is aligned with said build platform, and wherein said moving at least one of said indexing stage and said motion stage to align said build platform with said second material comprises operating said indexing stage to rotate said work table to a second angular position in which said second material is aligned with said build platform.

19. The method of claim 17, wherein said providing at least one reservoir containing at least two different materials comprises providing a single reservoir.

20. The method of claim 17, wherein said both said first material and said second material are liquid materials usable to manufacture structure of said object by selective curing in an additive manufacturing process.

21. The method of claim 17, wherein at least one of said first material and said second material is a rinse material that is not usable to manufacture structure of said object by selective curing in an additive manufacturing process.

* * * * *

UNITED STATES PATENT AND TRADEMARK OFFICE
CERTIFICATE OF CORRECTION

Page 1 of 1

PATENT NO. : 12,023,856 B2
APPLICATION NO. : 17/297305
DATED : July 2, 2024
INVENTOR(S) : Amir K. Miri Ramsheh et al.

It is certified that error appears in the above-identified patent and that said Letters Patent is hereby corrected as shown below:

In the Specification

Column 1, Line 4, add the following:
--STATEMENT OF GOVERNMENT INTEREST
The invention was made with government support under Grant No. R21 DC018818 awarded by the National Institute of Health. The government has certain rights in the invention.--

Signed and Sealed this
Seventeenth Day of December, 2024

Derrick Brent
*Acting Director of the United States Patent and Trademark Office*